US010482872B2

(12) United States Patent
Tokiwa et al.

(10) Patent No.: US 10,482,872 B2
(45) Date of Patent: Nov. 19, 2019

(54) SPEECH RECOGNITION APPARATUS AND SPEECH RECOGNITION METHOD

(71) Applicant: Olympus Corporation, Hachioji-shi, Tokyo (JP)

(72) Inventors: Hiroyuki Tokiwa, Hachioji (JP); Kenta Yumoto, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 80 days.

(21) Appl. No.: 15/825,087

(22) Filed: Nov. 28, 2017

(65) Prior Publication Data

US 2018/0158450 A1 Jun. 7, 2018

(30) Foreign Application Priority Data

Dec. 1, 2016 (JP) ................................. 2016-234118

(51) Int. Cl.
*G10L 15/02* (2006.01)
*G10L 25/57* (2013.01)
*G10L 15/25* (2013.01)
*G06K 9/00* (2006.01)

(52) U.S. Cl.
CPC .......... *G10L 15/02* (2013.01); *G06K 9/00221* (2013.01); *G06K 9/00335* (2013.01); *G10L 15/25* (2013.01); *G10L 25/57* (2013.01); *G10L 2015/022* (2013.01); *G10L 2015/025* (2013.01); *G10L 2015/027* (2013.01)

(58) Field of Classification Search
CPC ... G10L 15/24; G10L 15/25; G10L 2015/022; G10L 2015/025; G10L 2015/027; G10L 15/28
See application file for complete search history.

(56) References Cited

U.S. PATENT DOCUMENTS

| 5,430,826 A * | 7/1995 | Webster | G10L 25/78 704/200 |
| 8,700,392 B1 * | 4/2014 | Hart | G10L 15/25 704/231 |
| 2002/0065648 A1 * | 5/2002 | Amano | G10L 19/00 704/216 |
| 2003/0118973 A1 * | 6/2003 | Noble | G09B 19/04 434/167 |
| 2003/0220798 A1 * | 11/2003 | Schmid | G10L 15/28 704/276 |
| 2004/0117191 A1 * | 6/2004 | Seshadri | G10L 15/25 704/275 |

(Continued)

FOREIGN PATENT DOCUMENTS

JP 2005-507536 3/2005

*Primary Examiner* — Eric Yen
(74) *Attorney, Agent, or Firm* — John C. Pokotylo; Pokotylo Patent Services

(57) ABSTRACT

A speech recognition apparatus according to an embodiment includes a microphone that acquires an audio stream in which speech vocalized by a person is recorded, a camera that acquires an image data in which at least a mouth of the person is captured, and an operation element that recognizes speech including a consonant vocalized by the person, based on the audio stream, estimates the consonant vocalized by the person, based on the shape of the mouth of the person in the image data, and specifies the consonant based on the estimated consonant and the speech-recognized consonant.

9 Claims, 10 Drawing Sheets

(56) References Cited

U.S. PATENT DOCUMENTS

2014/0379346 A1* 12/2014 Aleksic .................. G10L 15/25
704/251
2015/0235641 A1* 8/2015 VanBlon ................ G10L 15/24
704/235
2015/0382047 A1* 12/2015 Van Os .................. G06F 16/73
725/38

* cited by examiner

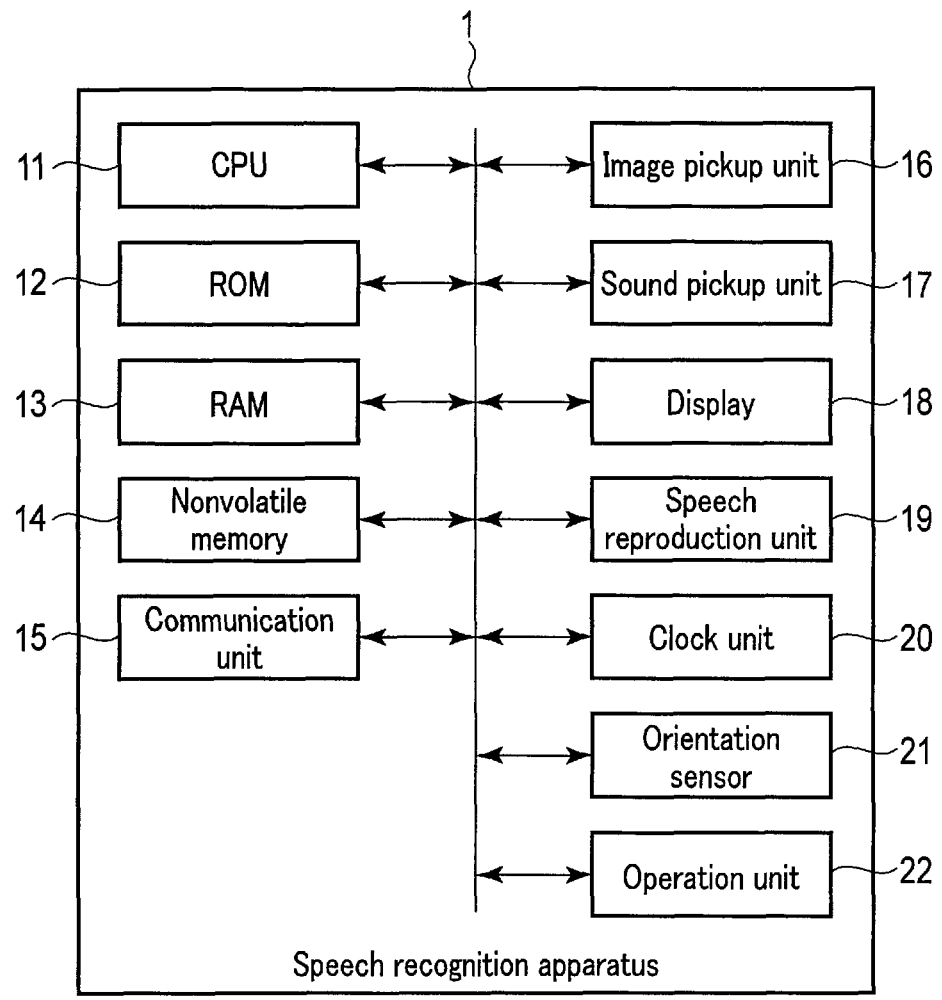
F I G. 1

| Item | Priority | First feature | Second feature | Third feature |
|---|---|---|---|---|
| Name | 1 | Difficult in text generation | 5 secs max | Up to several words, several syllables |
| Age | 2 | Number | 1 sec max | Up to three words, three syllables |
| Gender | 3 | Male or Female | 1 sec max | Up to one word, two syllables |
| Affected part | 4 | Specific word (affected part dictionary) | 2 secs max | Up to several words, several syllables for each word |
| Diagnosis results | 5 | Specific word (department dictionary) | Several secs max | No limitation |
| Date | 6 | Date | 1 sec max | No limitation |

FIG. 7

SPEECH RECOGNITION APPARATUS AND SPEECH RECOGNITION METHOD

CROSS-REFERENCE TO RELATED APPLICATIONS

This application is based upon and claims the benefit of priority from the prior Japanese Patent Application No. 2016-234118, filed Dec. 1, 2016, the entire contents of which are incorporated herein by reference.

FIELD

The present invention relates generally to a speech recognition apparatus and a speech recognition method.

BACKGROUND

Recently, speech recognition apparatuses that recognize speech and generate text data have become commercially practical. The speech recognition apparatuses may produce an error in recognition when recognizing speech and generating text data. For example, as described in Jpn. PCT National Publication No. 2005-507536 (hereinafter referred to as Patent Literature 1), a technique for correcting recognized text has been disclosed.

SUMMARY

A speech recognition apparatus according to an embodiment includes a microphone that acquires an audio stream in which speech vocalized by a person is recorded, a camera that acquires a video stream in which at least a mouth of the person is captured, and an operation element that recognizes speech including a consonant vocalized by the person, based on the audio stream, estimates a consonant vocalized by the person, based on the shape of the mouth of the person in the video stream, and specifies a consonant based on the estimated consonant and the speech-recognized consonant.

According to the present invention, it is possible to provide a speech recognition apparatus and a speech recognition method that can easily realize speech recognition with high accuracy.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is an explanatory drawing to explain an example configuration of a speech recognition apparatus according to an embodiment.

FIG. 7 is an explanatory drawing to explain an example of an item list in a speech recognition apparatus according to an embodiment.

DETAILED DESCRIPTION

Figure 2:
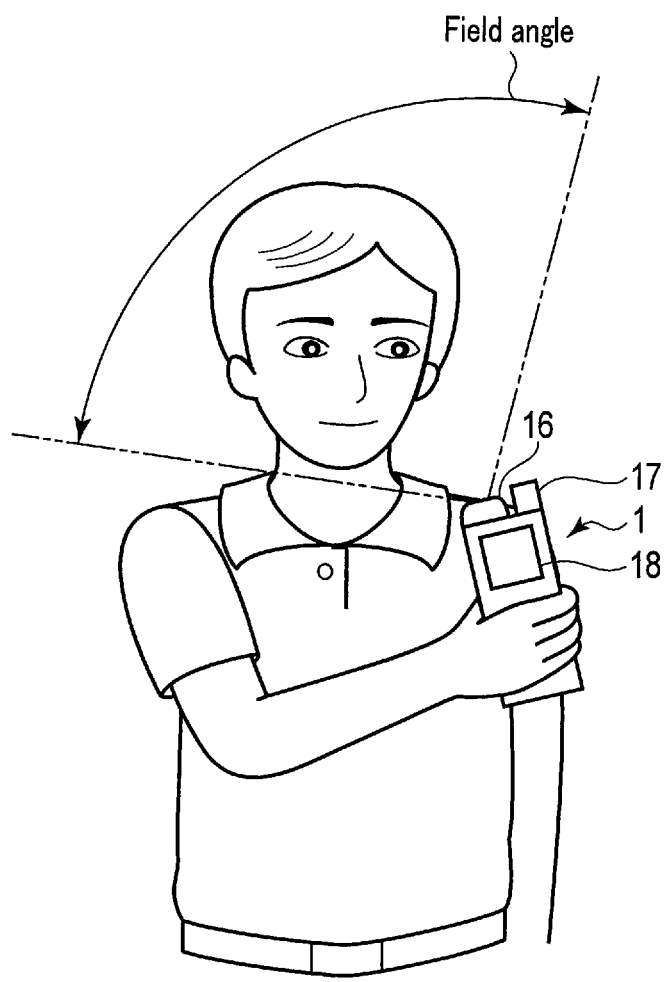
FIG. 2 is an explanatory drawing to explain an example of an arrangement of an image pickup unit and a sound pickup unit of a speech recognition apparatus according to an embodiment.

In the following, a speech recognition apparatus and a speech recognition method according to an embodiment will be described in detail with reference to the drawings.

FIG. 1 is an explanatory drawing to explain an example of a speech recognition apparatus 1 according to an embodiment. The speech recognition apparatus 1 is a terminal that performs recording of speech, recording of a video, and recognition of speech. FIG. 1 shows an example in which respective structures that perform recording of speech, recording of a video, or recognition of speech are integrally formed; however, the structures that perform recording of speech and recording of a video may be separate from the structure that performs recognition of speech. That is, the structures that perform recording of speech and recording of a video of the speech recognition apparatus may be a recorder that performs recording of speech and a video and generates a file (for example, an IC recorder, etc.). In addition, the structure of the speech recognition apparatus that performs recognition of speech may be a program placed in a cloud and performing speech recognition based on an acquired file.

The speech recognition apparatus 1 performs recording of speech and generates an audio stream. The audio stream is data indicating temporally consecutive speech. The speech recognition apparatus 1 performs recording a video and generates a video stream. The video stream is a type of image data that has a plurality of frames, each frame of which corresponds to a piece of an image. The video stream is data indicating temporally consecutive video (image). The speech recognition apparatus 1 synchronizes the audio stream with the video stream and generates a movie file. The speech recognition apparatus 1 also performs speech recognition based on the movie file and generates text data according to a word vocalized by a person.

As shown in FIG. 1, the speech recognition apparatus 1 includes a CPU 11, a ROM 12, a RAM 13, a nonvolatile memory 14, a communication unit 15, an image pickup unit 16, a sound pickup unit 17, a display 18, a speech reproduction unit 19, a clock unit 20, an orientation sensor 21, and an operation unit 22.

The CPU 11 is an operation element (for example, a processor) that performs arithmetic processing. The CPU 11 executes various processing based on data such as a program stored in the ROM 12. The CPU 11 functions as a controller that can execute various operations by executing a program stored in the ROM 12. For example, the CPU 11 controls each unit to perform recording of speech, recording of a video, and recognition of speech.

The ROM 12 is a read only nonvolatile memory. The ROM 12 stores a program and data used by the program, etc.

The RAM 13 is a volatile memory that functions as a working memory. The RAM 13 temporarily stores data etc. that is being processed by the CPU 11. In addition, the RAM 13 temporarily stores a program to be executed by the CPU 11.

The nonvolatile memory 14 is a storage medium that can store various information. The nonvolatile memory 14 stores a program and data used by the program, etc. The nonvolatile memory 14 is, for example, a solid state drive (SSD), a hard disk drive (HDD), or an other storage device. Instead of providing the nonvolatile memory 14, a memory I/F, such as a card slot in which a storage medium such as a memory card can be inserted, may be provided.

The communication unit 15 is an interface for communicating with the other devices. The communication unit 15 includes a terminal for electrically connecting with the other devices, or a communication circuit for wirelessly communicating with the other devices. The terminal is, for example, a USB terminal, a LAN connector, or an other terminal for connection by wiring. The communication circuit includes an antenna and a signal processing circuit for performing wireless communication with the other devices in compliance with the standards such as Bluetooth (registered trademark), or Wi-Fi (registered trademark), for example. The communication unit 15 may be configured to receive a control signal for controlling the speech recognition apparatus 1 from another device, and to supply the control signal to the CPU 11.

The image pickup unit 16 has a camera that acquires (captures) digital image data. In addition, the image pickup unit 16 consecutively acquires image data, and acquires a video stream which includes temporally consecutive image data. The video stream has a plurality of frames each of which is an image. The image pickup unit 16 includes an imaging element and an optical system that allows the imaging element to form an image by light.

The imaging element has an imaging surface in which a plurality of pixels that performs photoelectric conversion of light and stores electric charges are arranged. The pixels generate an electrical signal in accordance with the light amount of incident light. The imaging element includes, for example, a Charge Coupled Devices (CCD) image sensor, a Complementary Metal Oxide Semiconductor (CMOS) image sensor, or an other imaging element. A color filter is provided on a surface where light of the plurality of pixels arranged on the imaging surface enters. The imaging element generates a color image signal by the plurality of pixels to which color filters of different colors are provided.

The optical system is a composite lens in which a plurality of lenses are combined. The optical system forms an image on the imaging surface of the imaging element by light from a subject within a field angle in accordance with a focal length of the composite lens. The optical system may include a lens for focus adjustment (focus lens), for example. In addition, the optical system may include a lens for focus length adjustment (zoom lens), for example.

The image pickup unit 16 reads an electrical signal generated by a plurality of pixels of the imaging element, and converts the electrical signal into a digital signal to acquire digital image data. In addition, the image pickup unit 16 consecutively reads electrical signals generated by a plurality of pixels of the imaging element, and converts the electrical signals into digital signals to generate a video stream.

The sound pickup unit 17 has a microphone that acquires (records) speech. In addition, the sound pickup unit 17 consecutively acquires speech, and acquires an audio stream which includes temporally consecutive speech. The sound pickup unit 17 converts speech into an analog electrical signal, and converts the electrical signal into a digital signal to acquire digital audio data. The sound pickup unit 17 generates an audio stream based on the acquired audio data. That is, the image pickup unit 16 and the sound pickup unit 17 function as an acquisition unit to acquire a video stream and an audio stream.

The display 18 has a display device that displays a screen. The display 18 displays a screen on the display device, in accordance with a video signal input from the CPU 11 or a display controller such as a graphic controller not shown in the drawings.

The speech reproduction unit 19 has a speaker that reproduces speech. The speech reproduction unit 19 outputs speech from the speaker, in accordance with a speech signal input from the CPU 11 or an audio controller not shown in the drawings.

The clock unit 20 measures time. The clock unit 20 supplies information relating to time such as a current time or an elapsed time to the CPU 11.

The orientation sensor 21 is a sensor that detects an orientation of a housing (not shown in the drawings) of the speech recognition apparatus 1. The orientation sensor 21 supplies results of detection of the housing orientation to the CPU 11. For example, the orientation sensor 21 is a gyro sensor that detects rotation movement of the housing. In addition, the orientation sensor 21 may be an acceleration sensor that detects a direction of the housing relative to the gravitation direction, and detects displacement of the housing, for example.

The operation unit 22 generates an operation signal based on an operation of an operation member. The operation member is, for example, an operation key or a touch sensor. The touch sensor acquires information indicating a position designated within a given area. The touch sensor is formed integrally with the display 18 as a touch panel, and inputs a signal to the CPU 11 indicating a position touched on the screen displayed on the display 18.

The CPU 11 executes a program stored in the ROM 12 or the nonvolatile memory 14, etc. to allow the speech recognition apparatus 1 to execute recording processing, speech recognition processing, respective item speech recognition processing, and dictionary update processing, etc. The items for respective item speech recognition processing will be described later.

The recording processing is processing in which the speech recognition apparatus 1 acquires an audio stream and a video stream. When performing the recording processing, the CPU 11 generates an audio stream by the sound pickup unit 17, generates a video stream by the image pickup unit 16, generates a movie file based on the audio stream and the video stream, and stores the movie file to the nonvolatile memory 14. The video stream of the movie file does not have to be synchronized with the audio stream from the start to the end. The video stream of the movie file may be a stream recorded at least while a person is vocalizing. For example, the CPU 11 may be configured to externally acquire the video stream and the audio stream by an acquisition unit such as the communication unit 15.

In addition, the CPU 11 may be configured to prompt capturing a mouth when the speech recognition apparatus 1 acquires an audio stream and a video stream. For example, the CPU 11 may be configured to output information to prompt the lens of the image pickup unit 16 to be directed toward the mouth from the display 18 or the speech reproduction unit 19. Furthermore, the CPU 11 may be configured to determine whether at least the mouth of a person is captured, based on the video stream, and prompt capturing a mouth when the mouth of the person is not captured.

For example, as shown in FIG. 2, the lens of the image pickup unit 16 and the microphone of the sound pickup unit 17 are provided on the same surface of the housing of the speech recognition apparatus 1. In the case where a person vocalizes while holding the speech recognition apparatus 1 by hand, it is predicted that the person directs the microphone of the sound pickup unit 17 toward the mouth. With the structure where the lens of the image pickup unit 16 is provided on the same surface as the microphone of the sound pickup unit 17 is provided, if the microphone of the sound pickup unit 17 is directed to the mouth, the lens of the image pickup unit 16 is also directed to the mouth of the person. That is, as shown in FIG. 2, in the case where the lens of the image pickup unit 16 of the speech recognition apparatus 1 is directed to the mouth of the person, the mouth of the person is included in the field angle of the image pickup unit 16. The CPU 11 determines whether or not the mouth of the person is included in a frame of the video stream by performing image recognition. In addition, the CPU 11 may determine whether or not the mouth of the person is captured in accordance with the detection results by the orientation sensor 21. For example, if it is detected that the optical axis of the lens of the image pickup unit 16 of the speech recognition apparatus 1 is directed lower than the horizontal level by the orientation sensor 21, the CPU 11 may determine that the mouth of the person is not captured. In addition, for example, if it is detected that the optical axis of the lens of the image pickup unit 16 of the speech recognition apparatus 1 is directed vertically by the orientation sensor 21, the CPU 11 may determine that the mouth of the person is not captured.

The speech recognition processing is processing to generate text data in accordance with speech vocalized by a person based on the audio stream and the video stream. When performing the speech recognition processing, the CPU 11 compares a waveform of sound in the audio stream with a pre-stored acoustic model, and recognizes vowels and consonants, etc. That is, the CPU 11 functions as a speech recognition unit that recognizes speech including a consonant vocalized by a person, based on the audio stream.

The acoustic model is, for example, a waveform of sound that is pre-generated for each sound elements such as vowels and consonants, etc. The acoustic model is pre-stored in the nonvolatile memory 14 or the ROM 12, etc. For example, the CPU 11 compares a waveform of sound in the audio stream with a pre-stored acoustic model, and recognizes vowels and consonants, etc. corresponding to the acoustic model having a high similarity. The speech recognition apparatus 1 may be configured to pre-store a plurality of different acoustic models for respective languages or items in the nonvolatile memory 14, for example.

In addition, the CPU 11 recognizes a change in the mouth shape of a person when vocalizing, based on the video stream. The CPU 11 estimates a consonant vocalized by a person based on the recognized change in the mouth shape. For example, the CPU 11 estimates a consonant vocalized by a person by comparing the recognized change in the mouth shape with a pre-stored mouth shape model. That is, the CPU 11 functions as a consonant estimation unit that estimates a consonant vocalized by a person based on the mouth shape of the person in the video stream. The CPU 11 modifies the results of consonant recognition based on the audio stream, by using the results of consonant estimation. That is, the CPU 11 functions as a consonant specification unit that specifies a consonant based on the results of consonant estimation and the results of consonant recognition based on the audio stream.

The mouth shape model indicates, for example, a mouth shape change for each consonant. The mouth shape model is pre-stored in the nonvolatile memory 14. For example, the CPU 11 compares the recognized change in mouth shape with the mouth shape change indicated by a mouth shape model, and estimates a consonant corresponding to the mouth shape model having a high similarity as a consonant vocalized by the person. The speech recognition apparatus 1 may be configured to pre-store a plurality of different mouth shape models for respective languages or items in the nonvolatile memory 14, for example. The mouth shape models may further include a model indicating a mouth shape change for each vowel. In this case, the CPU 11 may compare the recognized change in mouth shape with the mouth shape change indicated by a mouth shape model, and estimate a vowel corresponding to the mouth shape model having a high similarity as a vowel vocalized by the person. For example, materials of a language not usually used, such as a foreign language, may include videos, photographs or pictures. Such image data can be used as is as an instruction image at the time of estimation. The determination at the time of estimation may be performed as a result of deep learning by using the instruction image.

In addition, the CPU 11 recognizes a word based on the results of vowel and consonant recognition and a pre-stored dictionary (word recognition dictionary), and generates text data based on the word recognition result.

A combination of vowels and consonants is associated with a word in the word recognition dictionary. The word recognition dictionary is pre-stored in the nonvolatile memory 14. The CPU 11 can recognize a word from the combination of vowels and consonants by referring to the word recognition dictionary. That is, the CPU 11 acquires a word according to the results of vowel and consonant recognition from the word recognition dictionary, by referring to the word recognition dictionary. The speech recognition apparatus 1 may be configured to pre-store a plurality of different word recognition dictionaries for respective languages or items in the nonvolatile memory 14. For example, the speech recognition apparatus 1 may be configured to pre-store a plurality of different word recognition dictionaries for respective items in the nonvolatile memory 14.

The respective item speech recognition processing is processing to perform recording processing and speech recognition processing for each of the preset items. The items indicate types of speech to be recognized. The items are appropriately determined in accordance with the field to which the speech recognition apparatus 1 is applied. For example, in the case where the speech recognition apparatus 1 is adopted for dictation in the medical field, the items are name, age, gender, affected part, diagnosis results, and date, etc. The items may be pre-stored or generated in accordance with an operation by the operation unit 22. The items are stored in the speech recognition apparatus 1 as an item list. The item list will be described later. It is assumed that consonants, vowels, words to be vocalized, etc. may vary depending on the items. Accordingly, as stated above, the word recognition dictionaries, mouth shape models, and acoustic models may be pre-stored for each item.

When performing the respective item speech recognition processing, the CPU 11 prompts vocalization for each of the preset items, and the speech recognition apparatus 1 acquires an audio stream and a video stream for each item. The CPU 11 recognizes a word vocalized by a person based on the audio stream, the video stream and the dictionary corresponding to the item.

Specifically, the CPU 11 selects one of the plurality of preset items. The CPU 11 outputs information to prompt the lens of the image pickup unit 16 to be directed toward a mouth and information indicating the selected item from the display 18 or the speech reproduction unit 19, and acquires an audio stream and a video stream from the image pickup unit 16 and the sound pickup unit 17.

The CPU 11 compares a waveform of sound in the audio stream with a pre-stored acoustic model, and recognizes vowels and consonants, etc. The CPU 11 recognizes a change in the mouth shape of a person when vocalizing, based on the video stream. The CPU 11 estimates a consonant vocalized by a person based on the recognized change in the mouth shape and the mouth shape model. The CPU 11 modifies the results of consonant recognition based on the audio stream, by using the results of consonant estimation.

The CPU 11 recognizes a word based on the results of vowel and consonant recognition and the word recognition dictionary, and generates text data based on the word recognition result. In this case, the CPU 11 recognizes a word based on the results of vowel and consonant recognition by referring to the word recognition dictionary corresponding to the selected item, and generates text data based on the word recognition result.

Dictionary update processing is processing to perform update of the word recognition dictionaries, acoustic models and mouth shape models, etc. In the case where the CPU 11 receives a word recognition dictionary, an acoustic model and a mouth shape model from another device through the communication unit 15, for example, the word recognition dictionary, acoustic model, and mouth shape model pre-stored in the nonvolatile memory 14 are rewritten by the received word recognition dictionary, acoustic model, and mouth shape model. The word recognition dictionary, acoustic model and mouth shape model may be updated separately. In addition, in the case where update of the word recognition dictionary, the acoustic model and the mouth shape model is not necessary, the word recognition dictionary, the acoustic model and the mouth shape model may be stored in the ROM 12, instead of the nonvolatile memory 14.

Figure 3:
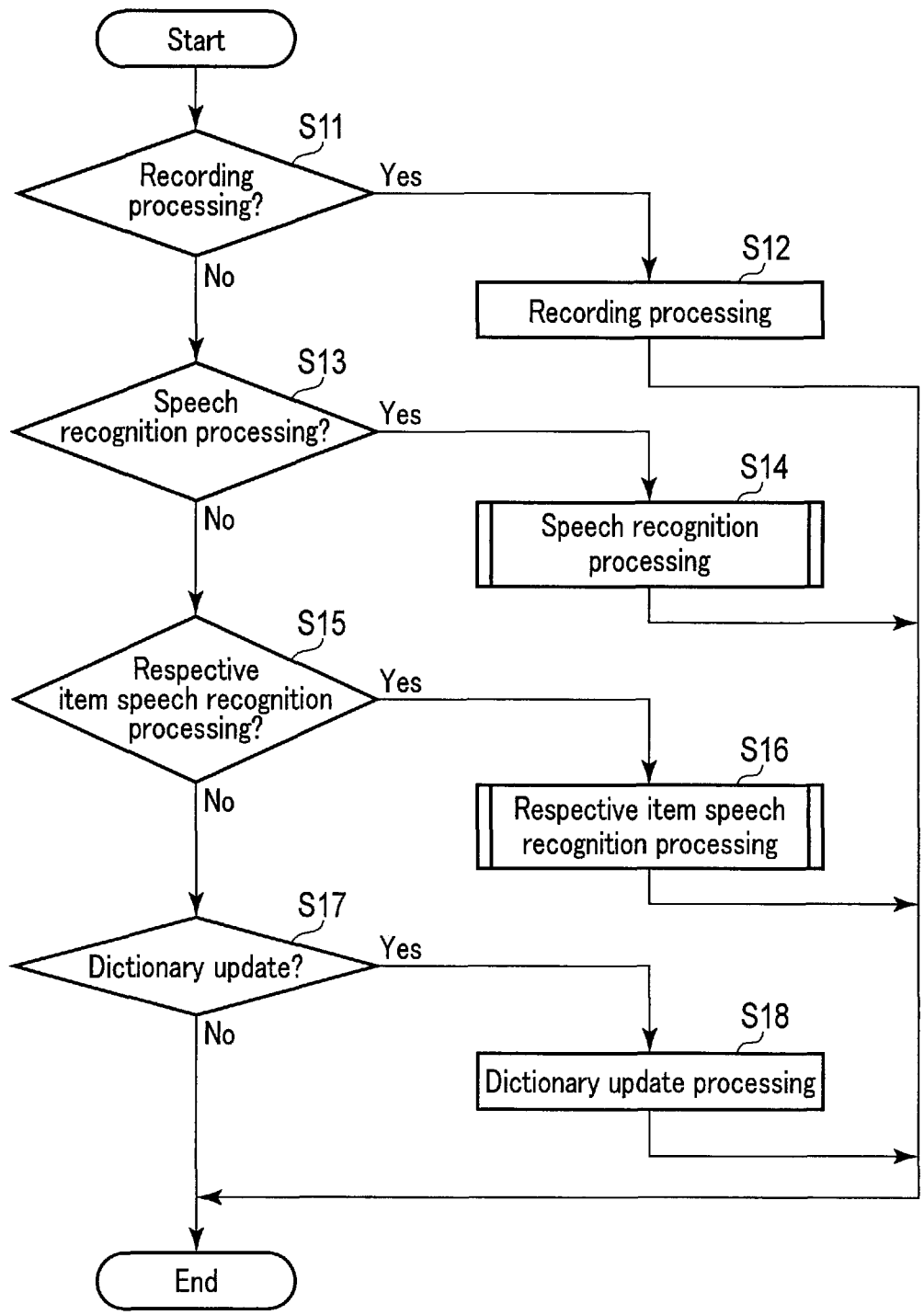
FIG. 3 is an explanatory drawing to explain an example of an operation of a speech recognition apparatus according to an embodiment.

FIG. 3 is a flowchart showing an example operation of the speech recognition apparatus 1. The CPU 11 of the speech recognition apparatus 1 performs various operations in accordance with the operation by the operation unit 22 or a control signal input through the communication unit 15.

First, the CPU 11 determines whether or not to perform recording processing (step S11). In the case where an operation to execute the recording processing is input by the operation unit 22, or information to instruct executing the recording processing is input by the communication unit 15, the CPU 11 determines to perform the recording processing.

In the case where the CPU 11 determines to perform the recording processing (step S11: Yes), the CPU 11 performs the recording processing to acquire an audio stream and a video stream by the image pickup unit 16 and the sound pickup unit 17 (step S12).

Next, the CPU 11 determines whether or not to perform speech recognition processing (step S13). In the case where an operation to execute the speech recognition processing is input by the operation unit 22, or information to instruct executing the speech recognition processing is input by the communication unit 15, the CPU 11 determines to perform the speech recognition processing. In the case where the CPU 11 determines to perform the speech recognition processing (step S13: Yes), the speech recognition processing is performed based on the acquired audio stream and video stream (step S14).

Next, the CPU 11 determines whether or not to perform respective item speech recognition processing (step S15). In the case where an operation to execute the respective item speech recognition processing is input by the operation unit 22, or information to instruct executing the respective item speech recognition processing is input by the communication unit 15, the CPU 11 determines to perform the respective item speech recognition processing. In the case where the CPU 11 determines to perform the respective item speech recognition processing (step S15: Yes), the CPU 11 performs the respective item speech recognition processing which acquires an audio stream and a video stream for each item by the image pickup unit 16 and the sound pickup unit 17, and analyzes speech for each item based on the acquired audio stream and video stream (step S16).

Next, the CPU 11 determines whether or not to perform dictionary update processing (step S17). In the case where the CPU 11 determines that the dictionary update processing is performed (step S17: Yes), the CPU 11 performs dictionary update processing based on the word recognition dictionary, acoustic model, and mouth shape model, etc. acquired through the communication unit 15 (step S18).

In the case where the recording processing is performed, the speech recognition processing is performed, the respective item speech recognition processing is performed, or it is determined that the dictionary update processing is not performed at step S17 (step S17: No), the CPU 11 terminates the processing. In addition, in the case where the recording processing is performed, the speech recognition processing is performed, the respective item speech recognition processing is performed, or it is determined that the dictionary update processing is not performed at step S17 (step S17: No), the CPU 11 may return to the processing of step S11.

Figure 4:
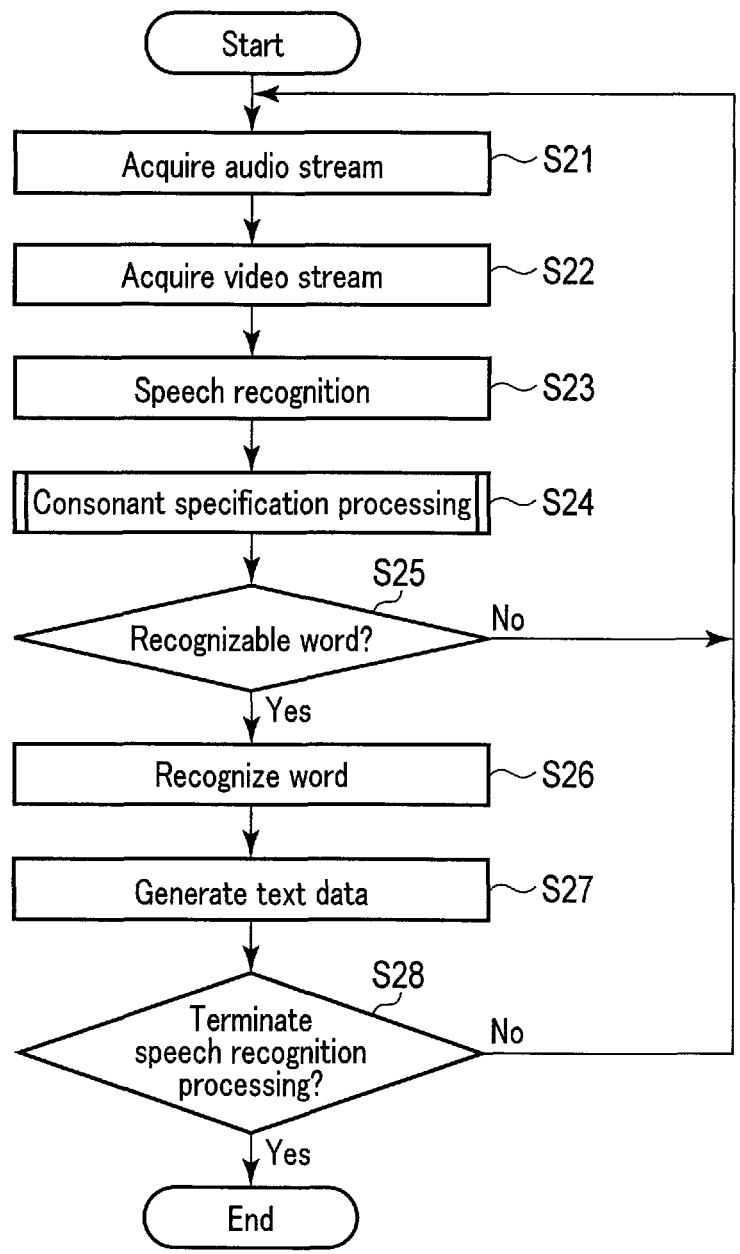
FIG. 4 is an explanatory drawing to explain an example of speech recognition processing of a speech recognition apparatus according to an embodiment.

FIG. 4 is a flowchart showing an example of the speech recognition processing executed by the speech recognition apparatus 1. Here, an example where the speech recognition apparatus 1 performs speech recognition based on an audio stream and a video stream of a movie file already generated by the recording processing will be described. However, the recording processing and the speech recognition may be performed simultaneously. That is, the speech recognition apparatus 1 may be configured to perform the speech recognition processing based on the audio stream and video stream successively generated by the recording processing.

First, the CPU 11 of the speech recognition apparatus 1 acquires an audio stream (step S21). For example, the CPU 11 acquires an audio stream by reproducing a movie file.

The CPU 11 acquires a video stream (step S22). For example, the CPU 11 acquires a video stream by reproducing a movie file.

The CPU 11 performs speech recognition based on the acquired audio stream (step S23). For example, the CPU 11 compares a waveform of sound in the audio stream with an acoustic model, and recognizes vowels and consonants, etc.

The CPU 11 performs consonant specification processing that specifies a consonant, based on the results of vowel and consonant recognition based on the audio stream, and the video stream (step S24). By this processing, the CPU 11 recognizes vowels and consonants from the audio stream and the video stream.

In the following, the consonant specification processing will be described.

Vowels and consonants vary with a shape of tongue, shape of lips, and degree of jaw opening, etc. Vowels are voiced sounds produced with vibration of the vocal folds, which can continue for a certain time. Consonants are sounds produced by impeding the air flow in the mouth. For example, phonemes of the Japanese language include consonants of voiceless stops, voiceless affricates, voiceless fricatives, nasals, semivowels and liquids, and vowels.

Vowels are represented by the shape of the tongue, the shape of the lips, and the degree of jaw opening, etc. In contrast, consonants are represented by a temporal change such as the movement and shape of tongue to change the air flow in the mouth, movement and shape of the jaw, and breath control. Accordingly, vowels can be specified based on the shape of the lips when vocalizing vowels easier than specifying consonants.

Examples of consonants distinguished by breath control include a long consonant and a short consonant that are distinguished by sound length. In addition, examples of consonants distinguished by breath control include a plosive consonant and a sonant consonant that are produced by a sudden impetus of breath. Such breath control may vary depending on types of language, regional differences, and individuals. Accordingly, there is a possibility that a person cannot control their breath accurately. For example, there is a case where some Japanese do not correctly distinguish consonants between "h" and "c", or between "l" and "r" in certain regions. In addition, for example, in the case where a person utters a consonant not distinguished in the person's native tongue, it may be difficult to mimic the movement and shape of the tongue, the movement and shape of the jaw, and breath control of a native speaker. Thus, if the person utters the consonant by emphasizing the difference, there is a possibility that the person's facial expression may change (be stiffened, for example). That is, the entire facial expression or posture may change in addition to the mouth shape by controlling a temporal change of the tongue, jaw, and breath to change the air flow. Accordingly, it is very important and effective to read a speaker's intention in consideration of information on an image change. Thus, a determination that takes into consideration an image is more advantageous in comparison with the case of determining a vowel.

For the aforementioned reasons, it is difficult to accurately recognize consonants and vowels only by sound. Accordingly, the speech recognition apparatus 1 improves accuracy of consonant recognition by analyzing the process from the utterance of the first consonant to the utterance of a vowel.

For example, in the case where a person vocalizes a consonant not distinguished in the person's native tongue (for example, "l" and "r"), it is assumed that "l" is vocalized while the mouth is relaxed, and "r" is vocalized while the lips are pouted out. In this case, there may be a case where it is difficult to distinguish the difference between "l" and "r" based on sound. However, as stated above, it is assumed that the shape of the tongue, the shape of the lips, and the degree of jaw opening are different between "l" and "r". Accordingly, the speech recognition apparatus 1 analyzes the change in the person's mouth by using consonant vocalization frames from the utterance of a consonant to the utterance of a vowel, to improve the accuracy of consonant recognition. Of course, the change in the mouth shape may be the change of image not only of the temporal discrete change in the instant month shape, but also of the consecutive change, the process of image change until a particular mouth shape is obtained, the change in the mouth, the change in the lower part of the face, the change in the entire face such as being stiffened, or the change in expression. As stated above, in addition to the basic change of a part important for utterance, such as a mouth, an image of near the mouth or a body part moved in combination with the mouth may be used. In the case where the change image cannot be determined due to a lack of shade or contrast of a particular part of the mouth, an image of a jaw, a condition of wrinkles or sagging around the mouth, or a change in shade of a stiffened face may be used additionally or substitutionally. The change in shape may often occur in the convergence process to a particular shape such as a vowel, and the change may be associated with an amplitude or a vibration. Furthermore, a combination of various factors or numerical values may be adopted, or a different image analysis method may be substituted in accordance with a particular status. The change may be observed by applying a particular pattern of light to a particular part of the face. In a language such as Japanese in which a vowel follows a consonant, in most cases the process to utter a vowel may be taken into account. However, in many languages an utterance ends with a consonant. In such a case, vibration of the vocal folds, the degree of opening, or the shape of the lips may be detected and analogized, instead of depending on a vowel. In this case, a speaker tends to control the air flow only by the apex of the tongue, for example, positioning the apex of the tongue to the alveolar ridge of the top front teeth or the apex of the top front teeth. Accordingly, the movement of the tongue can be obtained if an image of the tongue's position is detected from an opening of the mouth, etc.; however, it may be assumed from the facial expression.

Figure 5:
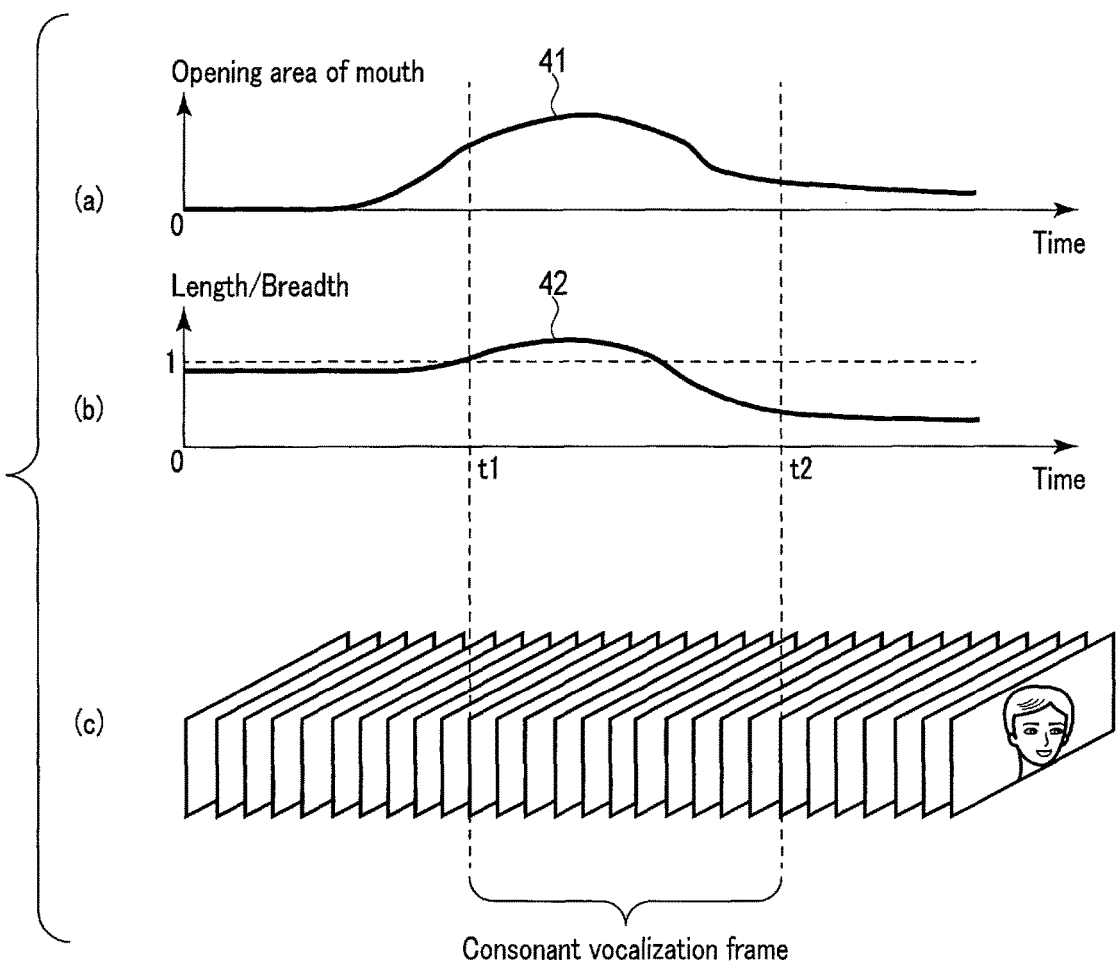
FIG. 5 is an explanatory drawing to explain an example of processing to specify a consonant vocalization frame of a speech recognition apparatus according to an embodiment.

FIG. 5 is an explanatory drawing to explain the processing to specify a consonant vocalization frame. In FIG. 5, the horizontal axis of (a) and (b) indicates time. Here, to simplify the basic way of thinking for a basic part in the aforementioned change, the explanation is given in the view point of opening area of a mouth. However, a combination of various factors or numerical values may be adopted, or a different image analysis method may be substituted in accordance with a particular status. For such a case where the number of image parts or variables becomes large, a method using deep learning of artificial intelligence may be adopted. However, a simplified explanation is given by using flowcharts or transition drawings, etc. In FIG. 5, the vertical axis of (a) indicates the opening area of a mouth of a person. That is, graph 41 of FIG. 5 indicates a change in the opening area of a mouth of a person when the person vocalizes a phoneme as "ra". In FIG. 5, the vertical axis of (b) indicates the ratio between breadth and length of a mouth of a person when the person vocalizes a phoneme as "ra". For example, the vertical axis of (b) in FIG. 5 indicates the ratio of length to breadth of a person's mouth. That is, graph 42 in FIG. 5 indicates the change in the ratio between the breadth and length of a mouth of a person. That is, graph 41 and graph 42 in FIG. 5 indicate the change in the shape of a person's mouth. In addition, (c) in FIG. 5 indicates an example of a video stream which includes consecutive frames including at least the mouth of a person who is vocalizing. The change in mouth shape is converted to a numerical value and expressed in a graph as stated above, so that the change in mouth shape may be simply indicated. In addition, consonant estimation based on the change in mouth shape can be expedited and simplified.

First, the CPU 11 detects a vowel. The CPU 11 detects a vowel based, for example, on an audio stream and an acoustic model. The CPU 11 may be configured to detect a vowel based on a video stream and a mouth shape model. In addition, the CPU 11 may be configured to detect vibration of throat of a person who is vocalizing based on a video stream, and detect a vowel based on the detected vibration of throat. As stated above, an image of near the mouth or a body part moved in combination with the mouth may be used, in addition to the basic change of a part important for utterance, such as a mouth, and an image of throat is used in this example. However, since there is a case where the throat lacks contrast, and has little variation, if an image of vibration cannot be determined, an image of the jaw, wrinkles or the degree of sagging around the mouth, a change in a cheek, or a change in a shade of a stiffened face may be used additionally or substitutionally. Here, the explanation is given from the standpoint of vibration. However, multiple times of vibration are not always necessary, and a single change in amplitude, etc. may be included. In addition to amplitude or vibration, a combination of various factors or numerical values may be adopted, or a different image analysis method may be substituted in accordance with a particular status. In addition, the change may be observed by applying a particular pattern of light to the throat, the mouth, or the cheeks, etc. As stated above, a vowel may be determined based not only on information of sound, but also on image information.

For example, it is assumed that a vowel ("a" in this example), is detected at timing t2. In this case, the CPU 11 specifies a consonant vocalization frame from the video stream from timing t1 before timing t2 to timing t2. The CPU 11 specifies at least one frame as a consonant vocalization frame in which a consonant ("r" in this example") is vocalized among the frames from timing t1 to timing t2. The CPU 11 may be configured to specify all the frames from timing t1 to timing t2 as consonant vocalization frames.

Timing t1 is a timing prior to timing t2 by a predetermined time, for example. Timing t1 may be a timing determined by the CPU 11 based on the video stream. For example, the CPU 11 determines a timing, as timing t1, when an opening area of a mouth becomes a predetermined value or greater within a predetermined time from timing t2. The CPU 11 may determine a timing, as timing t1, when the ratio between the breadth and length of a mouth becomes a predetermined value or greater within a predetermined time from timing t2, for example. In addition, the CPU 11 may detect a timing in which a sound of a predetermined volume or greater is recorded within a predetermined time from timing t2, from the audio stream, and may determine the detected timing as timing t1, for example. Furthermore, the CPU 11 may determine a timing within a predetermined time from timing t2, and by a predetermined time prior to any of the timing when an opening area of a mouth becomes a predetermined value or greater, the timing when the ratio between breadth and length of a mouth becomes a predetermined value or greater, and the timing in which a sound of a predetermined volume or greater is recorded, as timing t1, for example. It is assumed that the timing when an opening area of a mouth becomes a predetermined value or greater, the timing when the ratio between breadth and length of a mouth becomes a predetermined value or greater, and the timing in which a sound of a predetermined volume or greater is recorded, are close to a timing when a person starts an utterance. Accordingly, by determining timing t1 as stated above, a timing when a person begins an utterance can be set to a head of the consonant vocalization frames.

Figure 6:
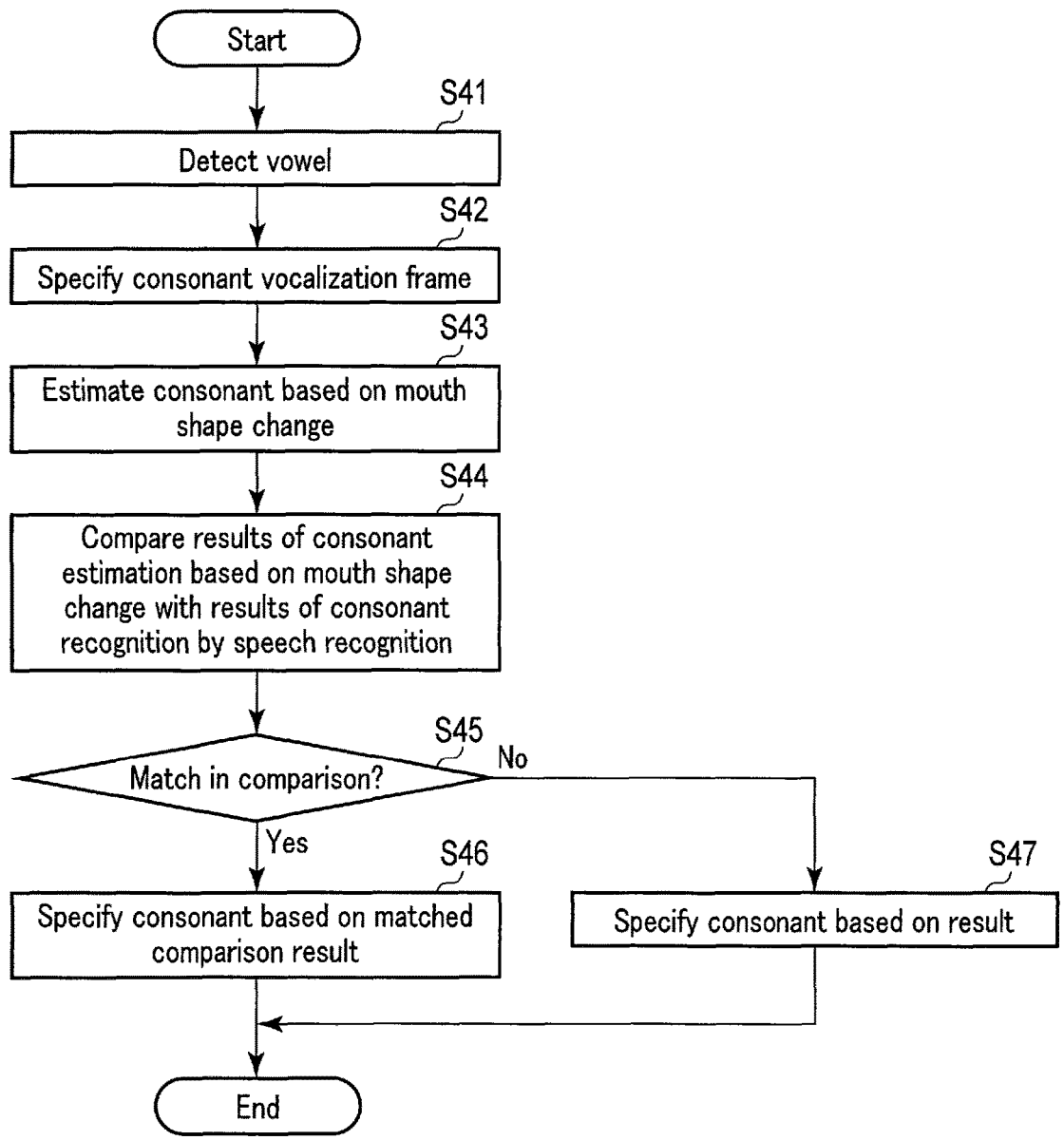
FIG. 6 is an explanatory drawing to explain an example of consonant specification processing of a speech recognition apparatus according to an embodiment.

FIG. 6 is an explanatory drawing to explain the consonant specification processing corresponding to step S26 shown in FIG. 4.

The CPU 11 detects a timing corresponding to a vowel from the speech recognition result based on the audio stream (step S41).

The CPU 11 specifies a consonant vocalization frame which is a frame of a video stream in which it is estimated that a consonant is vocalized, based on a timing corresponding to the detected vowel (step S42).

The CPU 11 recognizes a change in the mouth shape of the person in the specified consonant vocalization frame, and estimates a consonant based on the recognized change in the mouth shape of the person and a mouth shape model (step S43). The CPU 11 compares the recognized change in mouth shape with the mouth shape change indicated by the mouth shape model, and estimates a consonant corresponding to the mouth shape model having a high similarity as a consonant vocalized by the person. The CPU 11 compares the change in mouth shape over a plurality of frames with the change in mouth shape indicated in the mouth shape model.

The change in mouth shape may be the opening area of a mouth in a consonant vocalization frame, the ratio between breadth and length of a mouth in a consonant vocalization frame, or a numerical value obtained by combining the opening area of a mouth and the ratio between breadth and length of a mouth in a consonant vocalization frame.

The change in mouth shape may indicate a change in the opening area of a mouth over a plurality of consonant vocalization frames, a change in the ratio between breadth and length of a mouth over a plurality of consonant vocalization frames, or a numerical value obtained by combining the change in the opening area of a mouth and the change in the ratio between the breadth and length of a mouth over a plurality of consonant vocalization frames.

The CPU 11 compares the results of consonant estimation based on the change in mouth shape with the results of consonant recognition by speech recognition (step S44).

The CPU 11 determines whether the results of consonant estimation based on the change in mouth shape match the results of consonant recognition by speech recognition (step S45).

In the case where the CPU 11 determines as the comparison result that the results of consonant estimation based on the change in mouth shape match the results of consonant recognition by speech recognition (step S45: Yes), the CPU 11 specifies a consonant based on the matched comparison result (step S46). That is, the CPU 11 adopts the results of consonant estimation based on the change in mouth shape and the results of consonant recognition by speech recognition, specifies a consonant, and terminates the consonant specification processing.

In the case where the CPU 11 determines as the comparison result that the results of consonant estimation based on the change in mouth shape do not match the results of consonant recognition by speech recognition (step S45: No), the CPU 11 adopts one of the results of consonant estimation based on the change in mouth shape or the results of consonant recognition by speech recognition, specifies a consonant (step S47), and terminates the consonant specification processing. The CPU 11 adopts a predetermined one of the results of consonant estimation based on the change in mouth shape or the results of consonant recognition by speech recognition. In addition, when performing consonant estimation based on the change in mouth shape and consonant recognition by speech recognition, the CPU 11 may compute a score for each consonant, add the computed score for each consonant, and specify a consonant in accordance with the obtained score.

Furthermore, if the speech recognition apparatus 1 is configured to store a plurality of different mouth shape models for each language or each item, the CPU 11 may be configured to determine the language or an item of speech to be recognized, and perform the processing of step S43 by using the mouth shape model corresponding to the determined language or item.

The CPU 11 determines a language or an item of speech to be recognized, based on an input operation of the operation unit 22 or information supplied from another device through the communication unit 15.

If the aforementioned consonant specification processing is completed, the CPU 11 proceeds to step S25 shown in FIG. 4. That is, the CPU 11 determines whether a word is recognizable or not based on the vowel recognized by the speech recognition and the consonant specified by consonant specification processing (step S25). For example, the CPU 11 determines whether a word is recognizable or not based on the vowel recognized by the speech recognition, the consonant specified by consonant specification processing, and the word recognition dictionary. Specifically, the CPU 11 determines whether a word corresponding to a combination of the vowel recognized by the speech recognition and the consonant specified by the consonant specification processing is obtainable or not from the word recognition dictionary, by referring to the word recognition dictionary.

In the case where the CPU 11 determines that a word is not recognizable based on the vowel recognized by the speech recognition and the consonant specified by consonant specification processing (step S25: No), the CPU 11 proceeds to step S21 to perform steps S21 to S25 again.

In the case where the CPU 11 determines that a word is recognizable based on the vowel recognized by the speech recognition and the consonant specified by consonant specification processing (step S25: Yes), the CPU 11 acquires a word corresponding to the vowel recognized by the speech recognition and the consonant specified by consonant specification processing from the word recognition dictionary, and recognizes the word (step S26).

The CPU 11 generates text data based on the result of word recognition (step S27).

The CPU 11 determines whether or not to terminate the speech recognition processing (step S28). In the case where the CPU 11 determines that the speech recognition processing is not terminated (step S28: No), the CPU 11 proceeds to step S21 to perform steps S21 to S27 again.

In the case where the CPU 11 determines that the speech recognition processing is to be terminated (step S28: Yes), the CPU 11 terminates the speech recognition processing shown in FIG. 4. For example, in the case where the speech recognition processing is performed to the end of the audio stream and the video stream, the CPU 11 determines to terminate the speech recognition processing. In the case where an operation to terminate the speech recognition processing is input, the CPU 11 determines that the speech recognition processing is to be terminated.

As stated above, a consonant may be specified based on whether or not a word is recognizable based on the word recognition dictionary. In addition, there is a case where accurate determination of a word or text is more important than specification of a consonant. Accordingly, the CPU 11 may specify a consonant based on whether or not the consonant complies with certain rules (a word in a word dictionary or a predetermined grammar), instead of specifying a consonant based on whether or not a word is recognizable based on the word recognition dictionary. That is, a consonant may be determined based on the consistency of the entire text data generated in step S27, based on the results of consonant specification used as a preliminary specification result.

For example, the CPU 11 determines that the speech recognition processing is not terminated in the case where the consistency is checked and is determined to be insufficient in step S28. In this case, the CPU 11 proceed with steps S21 to step S27 to re-recognize a timing of a vowel, a timing of a consonant, a separation of a word based on the audio stream and the video stream. By this processing, the CPU 11 adds a candidate to the results of vowel and consonant recognition, and performs text generation by referring to the candidate. Of course, it is desirable that correct recognition of single words is performed since a similar word may have a different meaning. In such a case, it is desirable to integrally determine a word through the context. However, the explanation thereof will be omitted for simplification.

Furthermore, in the case where the speech recognition apparatus 1 is configured to store a plurality of different acoustic models for each language or each item, the CPU 11 may be configured to determine the language or an item of speech to be recognized, and perform the processing of step S23 by using the acoustic model corresponding to the determined language or item.

In the case where the speech recognition apparatus 1 is configured to store a plurality of different word recognition dictionaries for each language or each item, the CPU 11 may be configured to determine the language or an item of speech to be recognized, and perform the processing of step S27 and step S26 by using the word recognition dictionary corresponding to the determined language or item.

The CPU 11 determines the language or an item of speech to be recognized, based on an input operation of the operation unit 22 or information supplied from another device through the communication unit 15.

With the aforementioned structure, the speech recognition apparatus 1 recognizes a consonant and a vowel from the audio stream, and specifies a consonant vocalization frame in which a consonant is vocalized in the video stream which is synchronized with the audio stream, in accordance with the results of vowel recognition based on the audio stream. Furthermore, the speech recognition apparatus 1 estimates a consonant vocalized by a person based on the change in the mouth shape of the person in the consonant vocalization frame. By this processing, the speech recognition apparatus 1 can specify a consonant based on the results of consonant recognition based on the audio stream and the results of consonant estimation based on the video stream. As a result, the speech recognition apparatus 1 can improve the accuracy of speech recognition.

Next, the respective item speech recognition processing will be described.

In the following explanation, it is assumed that the speech recognition apparatus 1 is configured to perform the respective item speech recognition processing based on the successively generated audio stream and video stream. For this structure, the speech recognition apparatus 1 pre-stores an item list indicating items for which the respective item speech recognition processing is performed. The items indicate types of speech to be recognized, as described above. The item list indicates a list of types of speech to be recognized, namely, a list of items. The item list may be pre-stored or generated in accordance with an operation by the operation unit 22. In addition, the item list is configured to be modifiable in accordance with the operation by the operation unit 22.

FIG. 7 shows an example of the item list. In this example, a case where the speech recognition apparatus 1 is applied for dictation in the medical field is explained. As shown in FIG. 7, the items are name, age, gender, affected part, diagnosis results, and date, etc.

In addition, a priority is set to each item in the item list, for example. In the example of FIG. 7, the higher priority is set to name, age, gender, affected part, diagnosis results, and date in the order given. For example, the CPU 11 performs speech recognition processing in the order of priority, from highest to lowest.

In addition, each item of the item list is associated with various features, for example. For example, the feature associated with each item in the item list is information (first feature) indicating the type of each item. For example, the first feature is information with which the CPU 11 determines whether a word obtained by the recognition result is an appropriate word. In the case where the CPU 11 determines that the word obtained as the recognition result complies with the setting of the first feature, it is determined that the word obtained as the recognition result is appropriate. For example, if the item is "name", since it is not possible to direct the CPU 11 to determine whether a word is an appropriate word or not, the first feature is set to be blank. For example, if the item is "age," a number indicating age is set as the first feature. In addition, for example, if the item is "gender," a word indicating gender is set as the first feature. For example, if the item is "affected part," a particular word indicating an affected part (i.e., affected part dictionary including a list of affected parts) is set as the first feature. For example, if the item is "diagnosis results", a particular word indicating a diagnosis result (i.e., department dictionary including a list of diagnosis results for each department) is set as the first feature. For example, if the item is "date", a word indicating a date is set as the first feature.

In addition, for example, the feature associated with each item in the item list is information (second feature) indicating a time duration when recording processing is performed for respective items. When performing recording processing for a given item, the CPU 11 performs the recording processing for the time duration indicated by the second feature corresponding to the item. For example, if the item is "name", "maximum 5 seconds" is set as the second feature. For example, if the item is "age", "maximum 1 second" is set as the second feature. For example, if the item is "gender", "maximum 1 second" is set as the second feature. For example, if the item is "affected part", "maximum 2 seconds" is set as the second feature. For example, if the item is "diagnosis results", "maximum several minutes" is set as the second feature. For example, if the item is "date", "maximum 1 second" is set as the second feature.

In addition, for example, the feature associated with each item in the item list is information (third feature) indicating the number of words, and the number of syllables of each item. For example, the third feature is information with which the CPU 11 determines whether a word obtained as the recognition result is an appropriate word. In the case where the CPU 11 determines that the number of words, and the number of syllables obtained as the recognition result are compliant with the setting of the third feature, it is determined that the word obtained by the recognition result is appropriate. For example, if the item is "name", "up to several words, and several syllables" is set as the third feature. For example, if the item is "age", "up to three words, and three syllables" is set as the third feature. For example, if the item is "gender", "up to one word, and two syllables" is set as the third feature. For example, if the item is "affected part", "up to several words, and several syllables" is set as the third feature. For example, if the item is "diagnosis results" or "date", since it is difficult to determine whether the recognition result is appropriate based on the number of words and the number of syllables, the third feature is set to be blank (no limitation).

In the case where the respective item speech recognition processing is performed, the CPU 11 displays a screen (respective item speech recognition processing screen) 51 to perform the respective item speech recognition processing on the display 18, in accordance with the aforementioned item list.

Figure 8:
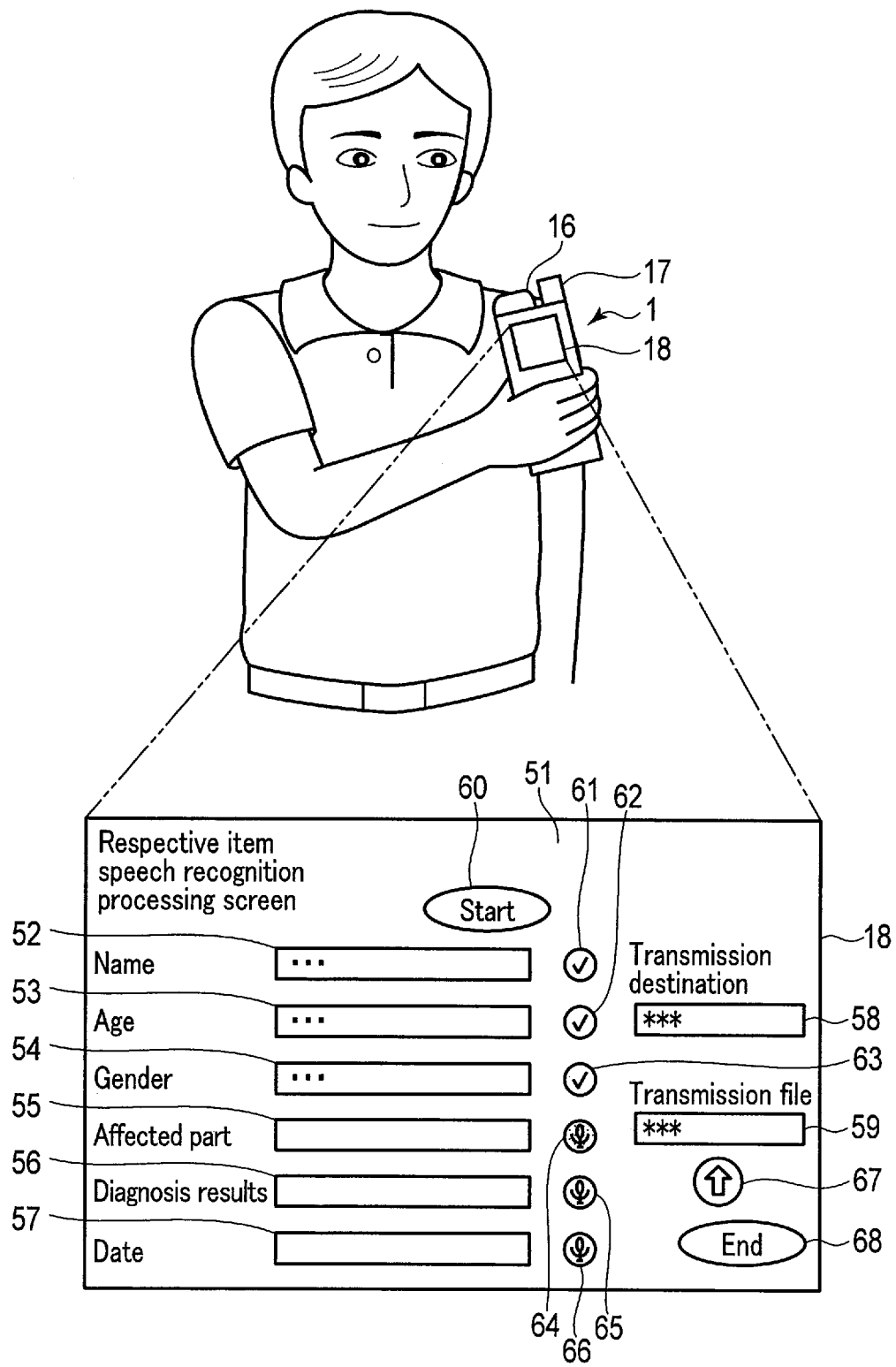
FIG. 8 is an explanatory drawing to explain an example of a screen of speech recognition for respective items displayed by a speech recognition apparatus according to an embodiment.

FIG. 8 shows an example of a respective item speech recognition processing screen 51. The respective item speech recognition processing screen 51 includes a first display column 52, a second display column 53, a third display column 54, a fourth display column 55, a fifth display column 56, a sixth display column 57, a seventh display column 58, an eighth display column 59, a start button 60, a first indicator 61, a second indicator 62, a third indicator 63, a fourth indicator 64, a fifth indicator 65, a sixth indicator 66, an upload button 67, and an end button 68, etc. The first display column 52, the second display column 53, the third display column 54, the fourth display column 55, the fifth display column 56, the sixth display column 57, the seventh display column 58, the eighth display column 59, the start button 60, the first indicator 61, the second indicator 62, the third indicator 63, the fourth indicator 64, the fifth indicator 65, the sixth indicator 66, the upload button 67, and the end button 68 are displayed on the respective item speech recognition processing screen 51 each in the manner where a selection operation can be performed by the operation unit 22.

The CPU 11 displays the first display column 52, the second display column 53, the third display column 54, the fourth display column 55, the fifth display column 56, and the sixth display column 57 on the respective item speech recognition processing screen 51, in accordance with the items included in the item list. Here, an example where the CPU 11 displays the respective item speech recognition processing screen 51 based on the item list indicated in FIG. 7.

The first display column 52 is an area where text data which is the speech recognition result for item, "name", is displayed. In the case where an input operation of characters is performed by the operation unit 22 in the state where the first display column 52 is selected, the CPU 11 edits the speech recognition result for "name" in accordance with the input operation by the operation unit 22.

The second display column 53 is an area where text data which is the speech recognition result for item, "age", is displayed. In the case where an input operation of characters is performed by the operation unit 22 in the state where the second display column 53 is selected, the CPU 11 edits the speech recognition result for "age" in accordance with the input operation by the operation unit 22.

The third display column 54 is an area where text data which is the speech recognition result for item, "gender", is displayed. In the case where an input operation of characters is performed by the operation unit 22 in the state where the third display column 54 is selected, the CPU 11 edits the speech recognition result for "gender" in accordance with the input operation by the operation unit 22.

The fourth display column 55 is an area where text data which is the speech recognition result for item, "affected part", is displayed. In the case where an input operation of characters is performed by the operation unit 22 in the state where the fourth display column 55 is selected, the CPU 11 edits the speech recognition result for "affected part" in accordance with the input operation by the operation unit 22.

The fifth display column 56 is an area where text data which is the speech recognition result for item, "diagnosis results", is displayed. In the case where an input operation of characters is performed by the operation unit 22 in the state where the fifth display column 56 is selected, the CPU 11 edits the speech recognition result for "diagnosis results" in accordance with the input operation by the operation unit 22.

The sixth display column 57 is an area where text data which is the speech recognition result for item, "date", is displayed. In the case where an input operation of characters is performed by the operation unit 22 in the state where the sixth display column 57 is selected, the CPU 11 edits the speech recognition result for "date" in accordance with the input operation by the operation unit 22.

The seventh display column 58 is an area in which information indicating a transmission destination of a file including the results of respective item speech recognition processing is displayed. In the case where an input operation of characters is performed by the operation unit 22 in the state where the seventh display column 58 is selected, the CPU 11 edits the transmission destination of a file in accordance with the input operation by the operation unit 22. The transmission destination is another device which is capable of communicating through the communication unit 15. For example, the transmission destination is a server provided on a network which is capable of communicating through the communication unit 15.

The eighth display column 59 is an area in which a file name of a file that includes the results of respective item speech recognition processing and which is to be sent to the transmission destination indicated in the seventh display column 58, is displayed. In the case where the eighth display column 59 is selected, the CPU 11 displays on the display 18 a list of files that can be sent. The CPU 11 selects a file to be sent to the transmission destination displayed on the seventh display column 58, in accordance with the operation by the operation unit 22. The CPU 11 displays a file name of the selected file in the eighth display column 59.

The start button 60 is a button which can be selected in accordance with the operation by the operation unit 22. In the case where the start button 60 is selected, the CPU 11 performs the respective item speech recognition processing. For example, in the case where the start button 60 is selected, the CPU 11 successively performs the respective item speech recognition processing for all items included in the item list. Specifically, in the case where the start button 60 is selected, the CPU 11 performs the respective item speech recognition processing in the order of priority from the highest to the lowest, i.e., in the order from "name", to "age", to "gender", to "affected part", to "diagnosis results", and to "date".

First, in the case where the respective item speech recognition processing is performed for "name", the CPU 11 indicates that the item for which the respective item speech recognition processing is performed is "name" on the display 18. In addition, the CPU 11 performs acquisition of an audio stream and a video stream, and speech recognition based on the audio stream to acquire the results of vowel and consonant recognition for the time duration indicated by the second feature. The CPU 11 recognizes a word based on the results of vowel and consonant recognition, and determines whether the word recognition result complies with the settings of the first feature and the third feature corresponding to "name". In the case where the CPU 11 determines that the word recognition result does not comply with the settings of the first feature and the third feature corresponding to "name", the CPU 11 modifies the results of vowel and consonant recognition by estimating a consonant vocalized by a person based on the video stream. The CPU 11 recognizes the word again based on the modified results of vowel and consonant recognition, and determines again whether the word recognition result complies with the settings of the first feature and the third feature corresponding to "name". In the case where the CPU 11 determines that the word recognition result complies with the settings of the first feature and the third feature corresponding to "name", the CPU 11 generates text data based on the word recognition result, and proceeds to the respective item speech recognition processing for the next item.

The CPU 11 performs the series of respective item speech recognition processing for each item of the item list. In the case where the respective item speech recognition processing for all the items of the item list is performed, the CPU 11 generates a file including the results of the respective item speech recognition processing. Furthermore, in the case where the CPU 11 generates a file including the results of the respective item speech recognition processing, the CPU 11 displays the generated file in the eighth display column 59.

The first indicator 61 to the sixth indicator 66 indicate the state of the respective item speech recognition processing for each item. The CPU 11 displays, to the first indicator 61 to the sixth indicator 66, an indication among any of an indication that the respective item speech recognition processing has not been performed, an indication that the respective item speech recognition processing is in progress, or an indication that the respective item speech recognition processing is completed.

The first indicator 61 indicates the state of the respective item speech recognition processing for "name". The second indicator 62 indicates the state of the respective item speech recognition processing for "age". The third indicator 63 indicates the state of the respective item speech recognition processing for "gender". The fourth indicator 64 indicates the state of the respective item speech recognition processing for "affected part". The fifth indicator 65 indicates the state of the respective item speech recognition processing for "diagnosis results". The sixth indicator 66 indicates the state of the respective item speech recognition processing for "date".

FIG. 8 shows an example where the respective item speech recognition processing is completed for "name", "age", and "gender", the respective item speech recognition processing is in progress for "affected part", and the respective item speech recognition processing has not been performed for "diagnosis results" and "date". In this case, the CPU 11 displays an indication that the respective item speech recognition processing has not been performed as the first indicator 61 to the third indicator 63. In addition, the CPU 11 displays an indication that the respective item speech recognition processing is in progress as the fourth indicator 64. The CPU 11 displays an indication that the respective item speech recognition processing is completed as the fifth indicator 65 to the sixth indicator 66. The CPU 11 may be configured to perform again the respective item speech recognition processing for an item corresponding to a selected indicator if any of the first indicator 61 to the sixth indicator 66 is selected.

The upload button 67 is a button which can be selected in accordance with the operation by the operation unit 22. If the upload button 67 is selected, the CPU 11 performs upload to send a file indicated in the eighth display column 59 to the transmission destination displayed in the seventh display column 58 by the communication unit 15.

The end button 68 is a button which can be selected in accordance with the operation by the operation unit 22. In the case where the end button 68 is selected, the CPU 11 terminates the respective item speech recognition processing. In the case where the end button 68 is selected in the state where the respective item speech recognition processing is performed, and there is a recognition result, the CPU 11 may display a button to allow the user to select whether the recognition result is discarded or not on the respective item speech recognition processing screen 51.

By displaying the aforementioned respective item speech recognition processing screen 51 on the display 18, the CPU 11 allows the user of the speech recognition apparatus 1 to confirm the state where the recording processing is in progress, the list of items, the items for which the respective item speech recognition processing has not been performed, the items for which the respective item speech recognition processing is in progress, the items for which the respective item speech recognition processing is completed, the transmission destination of a file, and a file to be transmitted, etc. Furthermore, the CPU 11 can perform modification of the results of respective item speech recognition processing, setting of the transmission destination of a file, and selection of a file to be transmitted, in accordance with the operation on the respective item speech recognition processing screen 51. As a result, the speech recognition apparatus 1 can improve convenience for the user.

Figure 9:
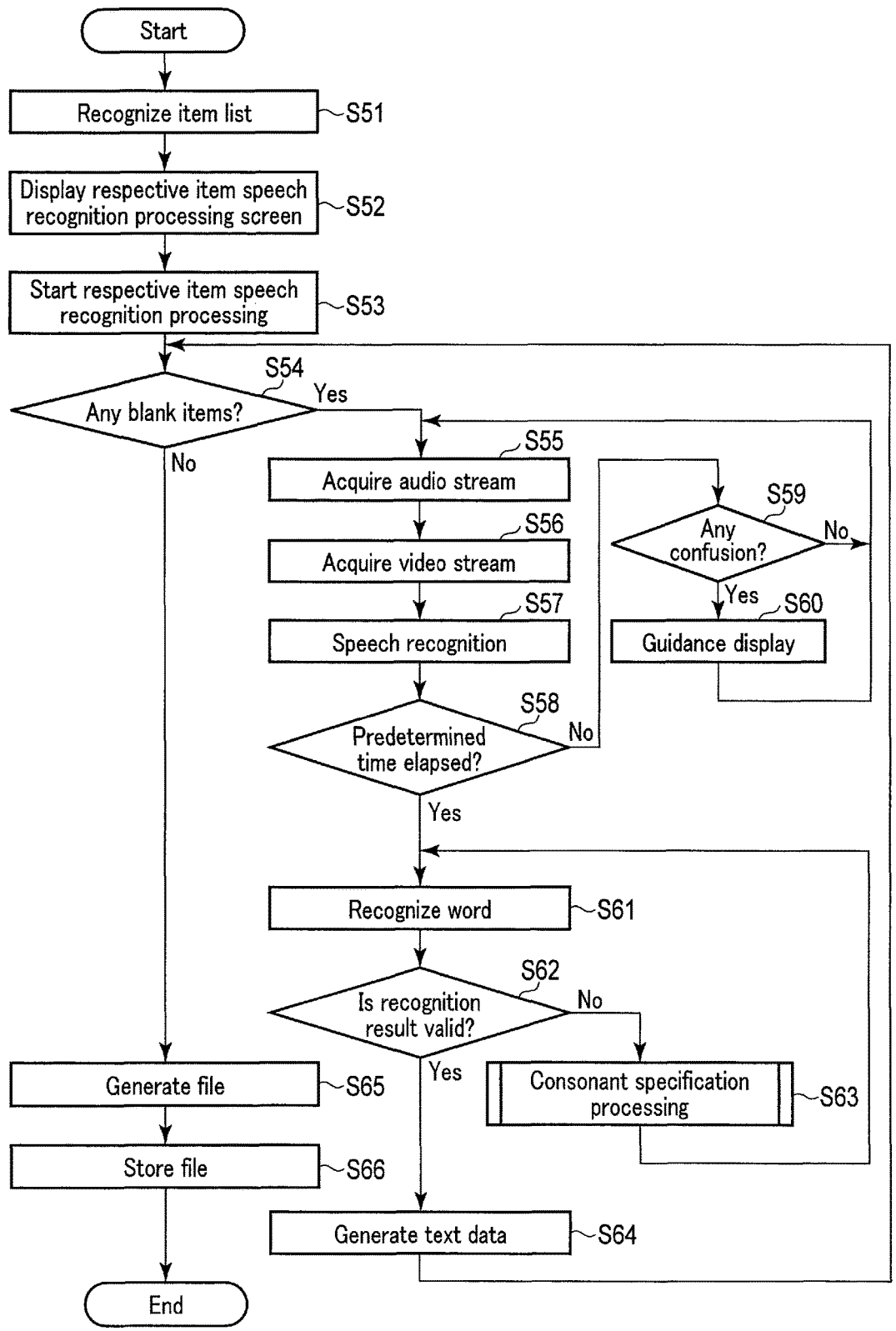
FIG. 9 is an explanatory drawing to explain an example of respective item speech recognition processing of a speech recognition apparatus according to an embodiment.

FIG. 9 is a flowchart showing a detailed example of respective item speech recognition processing of the speech recognition apparatus 1.

In the case where the respective item speech recognition processing is performed, the CPU 11 recognizes the item list, which is a list of items for which speech recognition is performed (step S51).

Based on the recognized item list, the CPU 11 allows the display 18 to display the respective item speech recognition processing screen 51 as shown in FIG. 8 (step S52).

Once the respective item speech recognition processing screen 51 is displayed, the CPU 11 starts the recording processing and the speech recognition processing for each item in the respective item speech recognition processing (step S53). For example, in the case where the start button 60 is selected on the respective item speech recognition processing screen 51, the CPU 11 starts the recording processing and the speech recognition processing for each item. In addition, for example, the CPU 11 may be configured to perform the recording processing and the speech recognition processing for an item corresponding to a selected indicator if any of the first indicator 61 to the sixth indicator 66 is selected on the respective item speech recognition processing screen 51. The CPU 11 may be configured to automatically start the recording processing and the speech recognition processing for each item without displaying the respective item speech recognition processing screen 51 as shown in FIG. 8.

The CPU 11 determines whether or not there is a blank item in the item list (step S54). For example, in the case where there is an item in which the speech recognition has not been performed in the item list, the CPU 11 determines that there is a blank item.

In the case where the CPU 11 determines that there is a blank item (step S54: Yes), the CPU 11 selects one of the blank items as a target item for the speech recognition, and acquires an audio stream from the sound pickup unit 17 (step S55). In addition, the CPU 11 may display information indicating which item is the selected item on the display 18.

The CPU 11 acquires a video stream from the image pickup unit 16 (step S56). That is, the CPU 11 captures an image of a mouth of a person who is vocalizing by the image pickup unit 16, and acquires a video stream. The CPU 11 may determine whether at least a mouth of a person is captured, based on the video stream, and prompts capturing a mouth when the mouth of the person is not captured.

The CPU 11 performs speech recognition based on the acquired audio stream (step S57). For example, the CPU 11 compares a waveform of sound in the audio stream with an acoustic model corresponding to the selected item, and recognizes vowels and consonants, etc. In addition, the CPU 11 may be configured to compare a waveform of sound in the audio stream with a plurality of acoustic models stored in the nonvolatile memory 14, and recognize vowels and consonants, etc.

The CPU 11 determines whether or not a predetermined time (time for performing the recording processing) corresponding to the selected item has elapsed, based on the elapsed time from starting the recording processing in step S55 (step S58). That is, the CPU 11 determines whether or not the recording processing is performed for the time duration indicated by the second feature associated with the selected item in step S55.

In the case where the CPU 11 determines that the predetermined time corresponding to the item has not elapsed (step S58: No), the CPU 11 determines whether or not confusion is detected (step S59). The CPU 11 detects confusion (for example, a pause in speech) in the case where a person who is vocalizing is at a loss for words. For example, the CPU 11 detects confusion if a voice of a predetermined volume or greater is not detected for a predetermined time.

Figure 10:
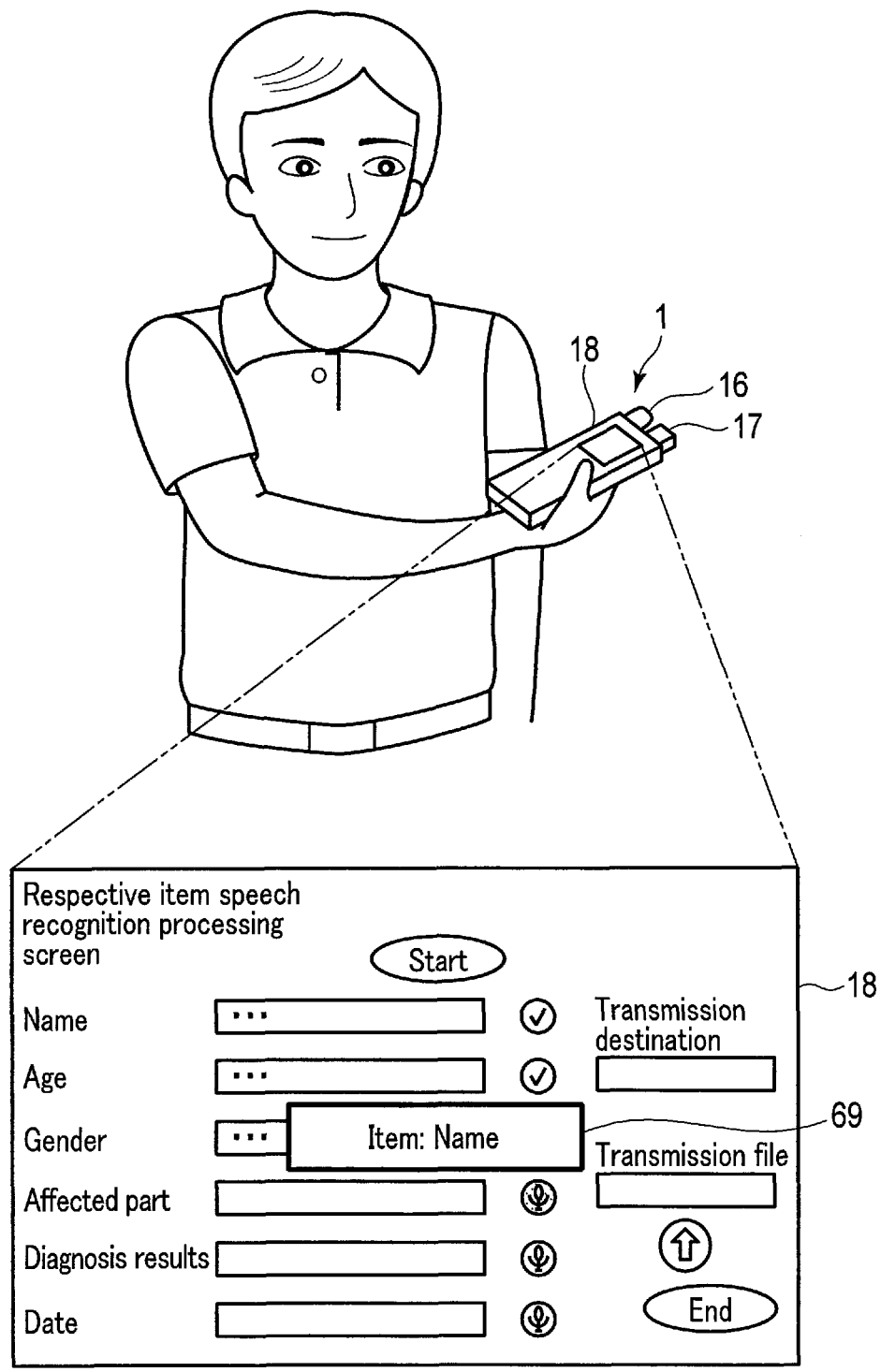
FIG. 10 is an explanatory drawing to explain an example of guidance display of a speech recognition apparatus according to an embodiment.

In the case where confusion is detected (step S59: Yes), the CPU 11 performs guidance display to display information indicating the item for which the recording processing is performed on the display 18 (step S60). FIG. 10 is an explanatory drawing to explain an example of guidance display. The CPU 11 superposes a guidance display 69 indicating the item for which the recording processing is performed on the respective item speech recognition processing screen 51, for example. By this processing, the speech recognition apparatus 1 can allow a person who is vocalizing to recognize the item for which the recording processing is performed in the case where the person forgets the item. The CPU 11 may be configured to output a voice indicating the item for which the recording processing is performed from the speech reproduction unit 19 in the case where confusion is detected. In the case where confusion is not detected in step S59 (step S59: No), or where guidance indication is performed in step S60, the CPU 11 proceeds to step S55, and repeats steps S55 to S60. Furthermore, the CPU 11 may be configured to display the guidance display 69 indicating an item on the display 18 every time the recording processing for each item starts in the respective item speech recognition processing.

The CPU 11 of the speech recognition apparatus 1 may display an indication that the recording processing is in progress on the display 18 in the case where the recording processing is performed in the respective item speech recognition processing. Specifically, the CPU 11 may indicate that the recording processing is in progress in the first indicator 61 to the sixth indicator 66 on the respective item speech recognition processing screen 51 while steps S55 and S56 are performed. By this processing, the speech recognition apparatus 1 can allow the person who is vocalizing to confirm that the recording processing is in progress.

In addition, the CPU 11 may be configured to capture an image of the mouth of the person by the image pickup unit 16 in the case where configuration is detected. It is assumed that the person does not vocalize a consonant or a vowel at a time when a speech is paused. Accordingly, it is assumed that the mouth of the person at the time when a speech is paused is a reference mouth shape which is not deformed for vocalization. In the case where a pause in speech is detected, the CPU 11 acquires an image of the mouth of the person captured by the image pickup unit 16 as a reference face image. The CPU 11 may normalize the opening area of the mouth of the person in FIG. 5 by using the reference face image. For example, the CPU 11 may compute a ratio of the opening area of the mouth of the person in each frame of the video stream to the opening area of the mouth of the person in the reference face image, and replace the computed ratio with graph 41 of FIG. 5.

In addition, the CPU 11 may detect a change in orientation from an orientation where the lens of the image pickup unit 16 of the speech recognition apparatus 1 is directed to a person who is vocalizing, to an orientation where the display 18 is directed to the person who is vocalizing by the detection results by the orientation sensor 21 while the recording processing is performed in the respective item speech recognition processing. That is, the CPU 11 may detect that the person who is vocalizing looks into the display 18. Specifically, the CPU 11 determines whether or not the person who is vocalizing looks into the display 18 during step S55 to step S58 of FIG. 9. Furthermore, the CPU 11 may be configured to display the guidance display 69 on the display 18 in the case where it is detected that the person who is vocalizing looks into the display 18. By this processing, the speech recognition apparatus 1 can allow the person who is vocalizing to confirm the item for which the respective item speech recognition processing is performed.

If the CPU 11 determines that the predetermined time corresponding to the item has elapsed in step S58 (step S58: Yes), the CPU 11 acquires a word corresponding to the results of vowel and consonant recognition from the word recognition dictionary in accordance with the selected item, and recognizes the word (step S61).

The CPU 11 determines whether or not the word recognition result is valid (step S62). As stated above, the CPU 11 determines whether or not the word recognition result in step S61 is a word corresponding to the selected item in step S55. That is, the CPU 11 determines whether or not the word recognition result in step S61 indicates a word corresponding to the first feature associated with the selected item in step S55, and whether or not the word recognition result indicates the number of words and the number of syllables corresponding to the third feature.

If it is determined that the word recognition result is not valid (step S62: No), the CPU 11 performs consonant specification processing similar to step S24 of FIG. 4 (step S63), and proceeds to step S61. That is, the CPU 11 performs the consonant specification processing in FIG. 6, and recognizes a word again. By this processing, the CPU 11 modifies the results of consonant recognition based on the audio stream, by using the results of consonant estimation based on the video stream, and recognizes a word based on the modified results of vowel and consonant recognition.

If it is determined that the word recognition result is valid (step S62: Yes), the CPU 11 generates text data based on the word recognition result (step S64), and proceeds to step S54. The CPU 11 proceeds to step S54, and determines again whether or not there is a blank item in the item list. In addition, in the case where the respective item speech recognition processing is completed for an item, the CPU 11 switches an indicator corresponding to the item for which the respective item speech recognition processing is completed among the first indicator 61 to the sixth indicator 66 to an indication that the respective item speech recognition processing is completed. Furthermore, in the case where it is determined that there is a blank item, the CPU 11 switches an indicator corresponding to the item for which the respective item speech recognition processing is to be subsequently performed among the first indicator 61 to the sixth indicator 66 to an indication that the respective item speech recognition processing is in progress. By this processing, the speech recognition apparatus 1 can allow the person who is vocalizing to confirm the item for which the respective item speech recognition processing is subsequently performed.

In the case where it is determined that there is no blank item in step S54 (step S54: No), the CPU 11 generates a file including the results of respective item speech recognition processing (step S65). The file includes, for example, an audio stream and text data. The file may further include a video stream.

The CPU 11 stores the generated file in the nonvolatile memory 14 (step S66), and terminates the respective item speech recognition processing.

Furthermore, the CPU 11 may upload the generated file in accordance with the operation on the respective item speech recognition processing screen 51. That is, in the case where the upload button 67 is selected on the respective item speech recognition processing screen 51 after the file is generated by the respective item speech recognition processing, the CPU 11 performs upload by the communication unit 15 to send a file indicated in the eighth display column 59 to the transmission destination displayed in the seventh display column 58.

With the aforementioned structure, the speech recognition apparatus 1 acquires an audio stream and a video stream by performing the recording processing for each item. The speech recognition apparatus 1 recognizes a consonant and a vowel from the audio stream, and recognizes a word based on the results of vowel and consonant recognition. The speech recognition apparatus 1 determines whether or not the word recognition result is appropriate to the item. In the case where the speech recognition apparatus 1 determines that a word recognition result does not comply with the item, the speech recognition apparatus 1 estimates a consonant based on the video stream, and modifies the results of vowel and consonant recognition based on the audio stream using the results of consonant estimation. The speech recognition apparatus 1 recognizes again a word based on the modified results of vowel and consonant recognition. By this processing, in the case where the speech recognition apparatus 1 determines that a word recognition result does not comply with the item, the speech recognition apparatus 1 recognizes a word again by using the results of consonant estimation based on the video stream. As a result, the speech recognition apparatus 1 can improve the accuracy of speech recognition.

As stated above, the speech recognition apparatus 1 performs the recording processing and the speech recognition while the item for which the speech recognition is performed is selected, thereby selecting a word recognition dictionary, an acoustic model, and a mouth shape model according to the item. By this processing, the speech recognition apparatus 1 can improve the accuracy of speech recognition.

In addition, the speech recognition apparatus 1 performs speech recognition for each item, thereby easily detecting the start of an utterance. By this processing, the speech recognition apparatus 1 can improve the accuracy of recognition of a consonant at the beginning of an utterance. In addition, the speech recognition apparatus 1 may estimate a subsequent vowel, consonant, or word, etc. based on the initial consonant, in accordance with a preset learning pattern. By this processing, the speech recognition apparatus 1 can effectively perform speech recognition.

In addition, the speech recognition apparatus 1 may be configured to perform the recording processing and the speech recognition, to select an item based on the results of the recording processing and the speech recognition, and to perform consonant specification processing by using a mouth shape model corresponding to the selected item, instead of selecting an item in advance. For example, the CPU 11 of the speech recognition apparatus 1 recognizes a word by matching the combination of a consonant and a vowel recognized by the speech recognition with the word recognition dictionary in accordance with the plurality of items, and selects an item in accordance with the word recognition dictionary in which the recognized word is stored. In addition, the CPU 11 of the speech recognition apparatus 1 selects an item according to the recognized word, and performs consonant specification processing by using the mouth shape model according to the selected item. By this processing, the speech recognition apparatus 1 can improve the accuracy of speech recognition even though an item is not set in advance.

In the aforementioned embodiment, it is explained that the acoustic model is a waveform of sound that is pre-generated for each sound element such as vowels and consonants, etc., but is not limited thereof. The acoustic model may be a waveform of sound that is pre-generated for each word. In the case where the acoustic model is a waveform of sound that is pre-generated for each word, the CPU 11 compares a waveform extracted from the audio stream with a waveform of the acoustic model, and recognizes a word.

The functions explained in the aforementioned embodiment may be implemented by loading a program into a computer, or may be implemented by hardware. Of course, it is difficult to perform highly accurate speech recognition only by information of limited sound, and accordingly, a context other than the input voice or the background of speech may be considered. In such a case, there may be a case where it is better to perform expansion of input information of an image or a voice, or to integrally consider various information or variables other than the input information. In such a case, it may be possible to allow deep learning for various information based on which artificial intelligence can make an effective determination (which may be instruction information if dictation results are fed back, effective information in the case where favorable results are input, and information in the case of failure is referred to). In such learning, the speech recognition having similar advantageous effects can be performed even without considering exact digitization or patterning of a change in mouth shape over time. The present application of course also covers such machine learning that includes the technical features of the present application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A speech recognition apparatus comprising:
   a microphone configured to acquire an audio stream in which speech vocalized by a person is recorded;
   a camera configured to acquire an image data in which at least a mouth of the person is captured;
   an operation element configured to recognize speech including a consonant vocalized by the person based on the audio stream, estimate the consonant vocalized by the person based on a mouth shape of the person in the image data, and specify the consonant based on the estimated consonant and the speech-recognized consonant,
   wherein the operation element specifies a consonant vocalization frame which is a frame in which it is estimated that the person in the image data has vocalized a consonant before a vowel based on a timing when the vowel is detected, and estimates the consonant vocalized by the person based on the mouth shape of the person in the consonant vocalization frame and a mouth shape model that indicates a change in mouth shape for each consonant.

2. The speech recognition apparatus according to claim 1, wherein each of a plurality of frames until a vowel is detected is the consonant vocalization frame, and the operation element estimates a consonant vocalized by the person based on a change in mouth shape of the person in the plurality of consonant vocalization frames and the mouth shape model that indicates a change in mouth shape for each consonant.

3. The speech recognition apparatus according to claim 2, wherein the operation element determines a timing before a timing when a vowel is detected by a predetermined time as a head of the consonant vocalization frames.

4. The speech recognition apparatus according to claim 2, wherein the operation element determines a timing when an opening area becomes a predetermined value or greater as a head of the consonant vocalization frames.

5. The speech recognition apparatus according to claim 2, wherein the operation element determines a timing when a ratio between breadth and length of a mouth becomes a predetermined value or greater as a head of the consonant vocalization frames.

6. The speech recognition apparatus according to claim 2, wherein the operation element determines a timing when a sound of a predetermined volume or greater is detected as a head of the consonant vocalization frames.

7. The speech recognition apparatus according to claim 2, wherein the operation element determines a timing before a timing when a sound of a predetermined volume or greater is detected by a predetermined time as a head of the consonant vocalization frames.

8. The speech recognition apparatus according to claim 1, wherein the operation element detects a timing when the person vocalizes a vowel based on the audio stream.

9. The speech recognition apparatus according to claim 1, wherein the operation element detects a timing when the person has vocalized a vowel based on the image data.

* * * * *